(12) United States Patent
Wen

(10) Patent No.: US 10,896,349 B2
(45) Date of Patent: Jan. 19, 2021

(54) TEXT DETECTION METHOD AND APPARATUS, AND STORAGE MEDIUM

(71) Applicant: TENCENT TECHNOLOGY (SHENZHEN) COMPANY LIMITED, Shenzhen (CN)

(72) Inventor: Yafei Wen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 124 days.

(21) Appl. No.: 16/284,787

(22) Filed: Feb. 25, 2019

(65) Prior Publication Data

US 2019/0188528 A1 Jun. 20, 2019

Related U.S. Application Data

(63) Continuation of application No. PCT/CN2017/114473, filed on Dec. 4, 2017.

(30) Foreign Application Priority Data

Dec. 8, 2016 (CN) .......................... 2016 1 1124294

(51) Int. Cl.
*G06K 9/34* (2006.01)
*G06K 9/62* (2006.01)
(Continued)

(52) U.S. Cl.
CPC .......... *G06K 9/6212* (2013.01); *G06K 9/325* (2013.01); *G06K 9/34* (2013.01); *G06K 9/342* (2013.01);
(Continued)

(58) Field of Classification Search
CPC .... G06K 9/325; G06K 9/3258; G06K 9/3266; G06K 9/34; G06K 9/342; G06K 9/38;
(Continued)

(56) References Cited

U.S. PATENT DOCUMENTS

| 6,553,131 B1* | 4/2003 | Neubauer et al. ....... G06K 9/32 382/105 |
| 2008/0095442 A1 | 4/2008 | Ekin et al. ..................... 382/187 |
| 2015/0039637 A1* | 2/2015 | Neuhauser et al. ......................... G06Q 30/0201 707/758 |

FOREIGN PATENT DOCUMENTS

| CN | 101122952 A | 2/2008 |
| CN | 101122953 A | 2/2008 |

(Continued)

OTHER PUBLICATIONS

Machine translation of CN 101122952 A (Feb. 13, 2008).*
(Continued)

*Primary Examiner* — Andrew W Johns
(74) *Attorney, Agent, or Firm* — Anova Law Group, PLLC

(57) ABSTRACT

Embodiments of the present disclosure provide a text detection method and apparatus, and a storage medium. The method includes: obtaining edge information of a to-be-detected image; and determining candidate text pixels in the to-be-detected image according to the edge information of the to-be-detected image by using a preset candidate text pixel determining strategy. The method also includes performing projection based segmentation on the candidate text pixels to obtain a projection based segmentation result. The method also includes determining one or more text regions in the to-be-detected image according to the projection based segmentation result.

18 Claims, 16 Drawing Sheets

(51) Int. Cl.
  *G06K 9/46* (2006.01)
  *G06K 9/32* (2006.01)
  *G06K 9/38* (2006.01)

(52) U.S. Cl.
  CPC ............ *G06K 9/38* (2013.01); *G06K 9/4604* (2013.01); *G06K 9/4642* (2013.01)

(58) Field of Classification Search
  CPC .. G06K 9/4604; G06K 9/4642; G06K 9/4647; G06K 9/6212; G06K 2209/015; G06T 7/10; G06T 7/11; G06T 7/12; G06T 7/13; G06T 7/187; G06T 7/194; G06T 2207/20068; G06T 2207/20112; H04N 1/38; H04N 1/40062; H04N 1/407; H04N 1/4072; H04N 1/4074
  See application file for complete search history.

(56) References Cited

FOREIGN PATENT DOCUMENTS

| | | |
|---|---|---|
| CN | 101676099 A | 3/2010 |
| CN | 103679168 A | 3/2014 |

OTHER PUBLICATIONS

Machine translation of CN 101122953 A (Feb. 13, 2008).*
The World Intellectual Property Organization (WIPO), International Search Report for PCT/CN2017/114473, dated Feb. 26, 2018, 6 Pages (including translation).

* cited by examiner

TEXT DETECTION METHOD AND APPARATUS, AND STORAGE MEDIUM

CROSS REFERENCE OF RELATED APPLICATIONS

This application a continuation application of PCT Patent Application No. PCT/CN2017/114473, filed on Dec. 4, 2017, which claims priority to China Patent Application No. 201611124294.4, filed with the Chinese Patent Office on Dec. 8, 2016, the entire contents of both of which are incorporated herein by reference.

FIELD OF TECHNOLOGY

The present disclosure relates to the field of image processing technologies, and in particular, to a text detection method and apparatus, and a storage medium

BACKGROUND OF THE DISCLOSURE

With the rapid development of Internet technologies, picture content over the Internet grows explosively. It is of extremely important study and application value to detect text in pictures. For example, text detection is applied to picture classification, picture retrieval, and text recognition.

A commonly used method at present is a text detection solution based on Stroke Width Transform (SWT). The solution mainly includes: extracting a canny edge and a gradient direction of an input image by using a fixed threshold; performing SWT; performing connected domain analysis on an edge image; adding a stroke width constraint; removing by filtration, according to prior knowledge such as a variance, a mean value, a height, a width, and an aspect ratio of connected-domain strokes, non-text connected domains that obviously do not meet requirements, where connected domains obtained through the foregoing steps are individual candidate characters; and then merging candidate characters with similar stroke widths, similar colors, and close distances into a full row.

However, when the foregoing solution is used to perform text detection on complex images with low contrast ratios and rich background textures, false positives and false negatives occur easily, and the detection speed is low. Therefore, the foregoing solution is not suitable for scenarios of real-time or large data processing. There is no effective solution to this problem currently.

SUMMARY

Embodiments of the present disclosure provide a text detection method and apparatus, and a storage medium, so that the accuracy and speed of text detection can be improved.

One aspect of the embodiments of the present disclosure provides a text detection method applied to a computing device. The method includes: obtaining edge information of a to-be-detected image; and determining candidate text pixels in the to-be-detected image according to the edge information of the to-be-detected image by using a preset candidate text pixel determining strategy. The method also includes performing projection based segmentation on the candidate text pixels to obtain a projection based segmentation result. The method also includes determining one or more text regions in the to-be-detected image according to the projection based segmentation result.

Another aspect of the embodiments of the present disclosure provides a text detection apparatus. The apparatus includes: a memory configured to store an executable program and a processor coupled to the memory. The processor is configured to obtain edge information of a to-be-detected image; and determine candidate text pixels in the to-be-detected image according to the edge information of the to-be-detected image by using a preset candidate text pixel determining strategy. The processor is also configured to perform projection based segmentation on the candidate text pixels to obtain a projection based segmentation result. The processor is also configured to determine one or more text regions in the to-be-detected image according to the projection based segmentation result.

Another aspect of the embodiments of the present disclosure provides a non-transitory storage medium, storing an executable program. When the executable program is executed by a processor, the program causes the processor to obtain edge information of a to-be-detected image; and determine candidate text pixels in the to-be-detected image according to the edge information of the to-be-detected image by using a preset candidate text pixel determining strategy. The program also causes the processor to perform projection based segmentation on the candidate text pixels to obtain a projection based segmentation result. The program also causes the processor to determine one or more text regions in the to-be-detected image according to the projection based segmentation result.

In the embodiments of the present disclosure, edge information of a to-be-detected image can be obtained; candidate text pixels in the to-be-detected image are determined according to the edge information of the to-be-detected image by using a preset candidate text pixel determining strategy; projection based segmentation is performed on the candidate text pixels, and then a text region in the to-be-detected image can be determined according to a projection based segmentation result. As such, the accuracy of text detection and the speed of text detection can be improved.

BRIEF DESCRIPTION OF THE DRAWINGS

To describe the technical solutions of the embodiments of the present disclosure or the prior art more clearly, the accompanying drawings required for illustrating the embodiments or the prior art will be introduced briefly in the following. Apparently, the drawings in the following description are only some embodiments of the present disclosure, and a person of ordinary skill in the art may obtain other drawings based on these accompanying drawings without creative efforts.

FIG. 1-2 is a diagram of another optional architecture of a text detection method according to an embodiment of the present disclosure;

FIG. 2 is a schematic flowchart of a first embodiment of a text detection method according to an embodiment of the present disclosure;

FIG. 3-1 is an image and a corresponding gray level histogram of the image according to an embodiment of the present disclosure;

FIG. 3-2 is another image and the corresponding gray level histogram according to an embodiment of the present disclosure;

FIG. 3-3 is still another image and the corresponding gray level histogram according to an embodiment of the present disclosure;

FIG. 3-4 is further another image and the corresponding gray level histogram according to an embodiment of the present disclosure;

FIG. 3-5 is a schematic diagram of a text detection result according to an embodiment of the present disclosure;

FIG. 3-6 is a schematic diagram of another text detection result according to an embodiment of the present disclosure;

FIG. 3-7 is a schematic diagram of still another text detection result according to an embodiment of the present disclosure;

FIG. 3-8 is a schematic diagram of further another text detection result according to an embodiment of the present disclosure;

FIG. 4 is a schematic flowchart of a second embodiment of a text detection method according to an embodiment of the present disclosure;

FIG. 5-1 is a schematic diagram of further another text detection result according to an embodiment of the present disclosure;

FIG. 5-2 is a schematic diagram of further another text detection result according to an embodiment of the present disclosure;

FIG. 5-3 is a schematic diagram of further another text detection result according to an embodiment of the present disclosure;

FIG. 5-4 is a schematic diagram of further another text detection result according to an embodiment of the present disclosure;

FIG. 6 is a schematic structural diagram of a text detection apparatus according to an embodiment of the present disclosure; and FIG. 7 is a schematic structural diagram of a server according to an embodiment of the present disclosure.

DESCRIPTION OF EMBODIMENTS

The following clearly and completely describes the technical solutions in the embodiments of the present disclosure with reference to the accompanying drawings in the embodiments of the present disclosure. Obviously, the described embodiments are only some embodiments rather than all embodiments of the present disclosure. All other embodiments obtained by a person of ordinary skill in the art based on the embodiments of the present disclosure without any creative efforts fall within the protection scope of the present disclosure.

Figure 1:
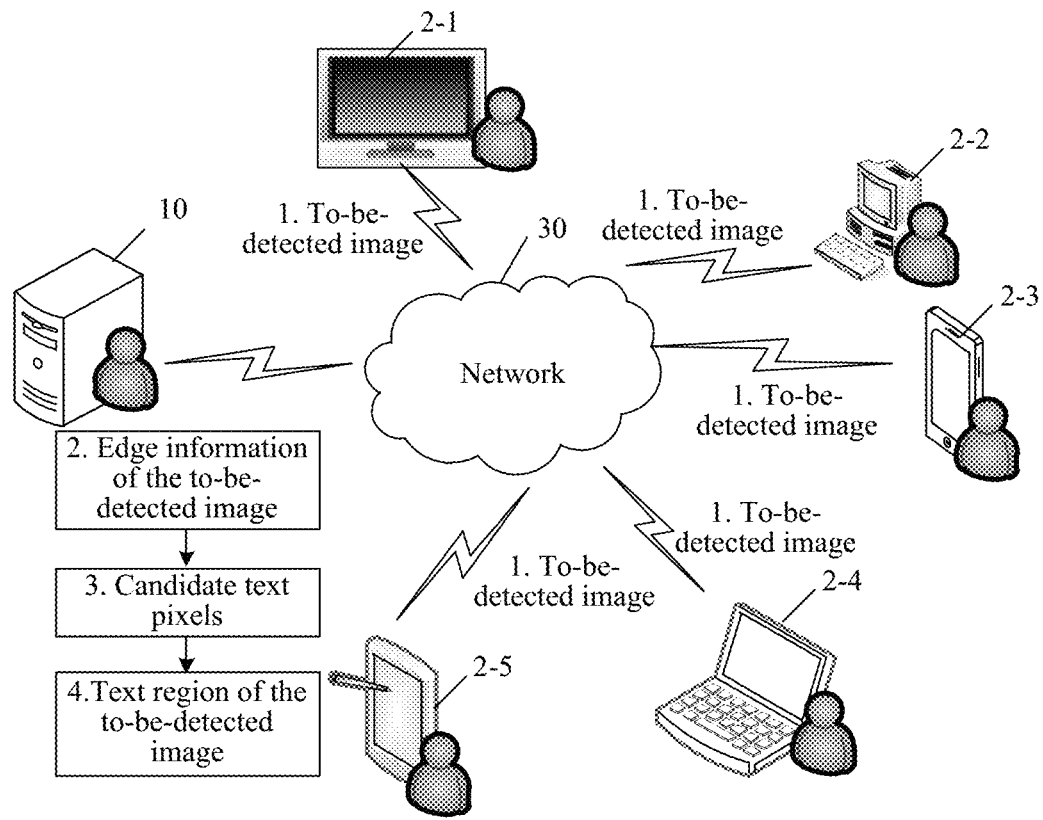
FIG. 1-1 is a diagram of an optional architecture of a text detection method according to an embodiment of the present disclosure.

As shown in FIG. 1-1, FIG. 1-1 is a diagram of an optional architecture in an embodiment of the present disclosure for performing a text detection method according to an embodiment of the present disclosure. FIG. 1-1 includes: a server 10, a terminal 20, and a network 30. The network 30 includes network entities such as a router and a gateway, which are not shown in FIG. 1-1. The terminal 20 exchanges network data with the server 10 through a wired network or a wireless network, so that after obtaining a to-be-detected image from the terminal 20, the server 10 determines and saves a text region in the to-be-detected image. Types of the terminal 20 are as shown in FIG. 1-1, including a mobile phone (terminal 2-3), a tablet computer or a PDA (terminal 2-5), a desktop computer (terminal 2-2), a PC (terminal 2-4), an all-in-one machine (terminal 2-1), and the like. Various application functional modules required by a user are installed in the terminal 20, for example, entertainment applications (such as a video application, an audio player application, a game application, and reading software), service applications (such as a map navigation application, a group purchase application, and a shooting application), and system functions such as setting applications.

Figures 1, 2:
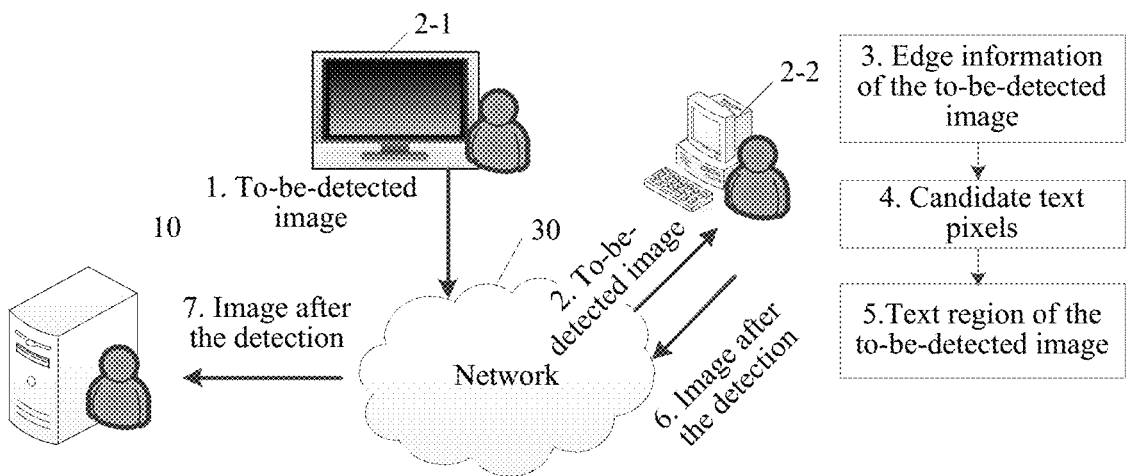
Figure 2:
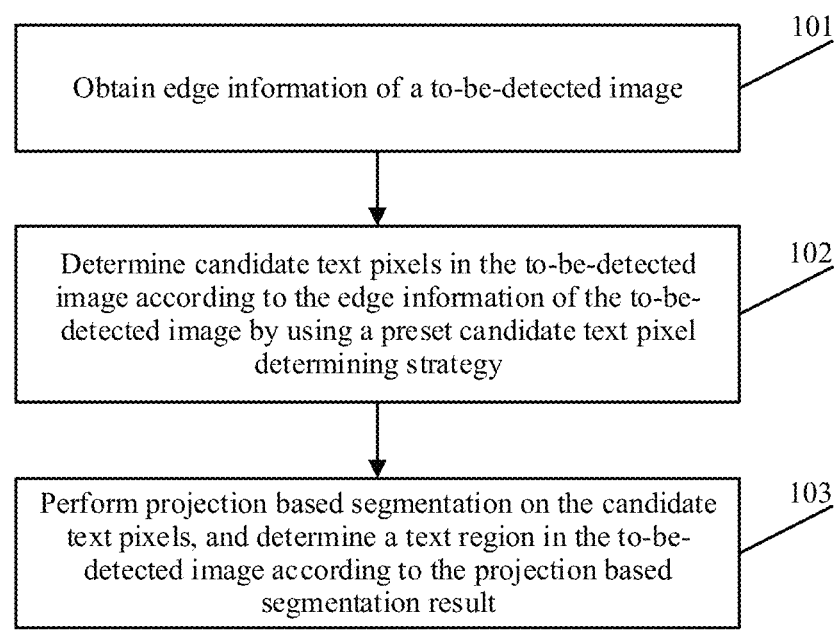

As shown in FIG. 1-2, FIG. 1-2 is a diagram of another optional architecture in an embodiment of the present disclosure for performing a text detection method according to an embodiment of the present disclosure. FIG. 1-2 includes: one or more servers 10, a terminal 20, and a network 30. The network 30 includes network entities such as a router and a gateway, which are not shown in FIG. 1-2. The terminal 20 exchanges network data with the server 10 through a wired network or a wireless network, so that after recognizing a to-be-detected image and determining a text region in the to-be-detected image, the terminal 20 sends the determined text region in the to-be-detected image to the server 10 through the network 30. Various application functional modules required by a user are installed in the terminal 20, for example, entertainment applications (such as a video application, an audio player application, a game application, and reading software), service applications (such as a map navigation application, a group purchase application, and a shooting application), and system functions such as setting applications Based on the network architectures shown in FIG. 1-1 and FIG. 1-2, for the implementation of a text detection apparatus according to an embodiment of the present disclosure, in an optional embodiment of the present disclosure, the text detection apparatus may be implemented on a server side or on a terminal side.

Based on the network architectures shown in FIG. 1-1 and FIG. 1-2, a first embodiment of a text detection method according to an embodiment of the present disclosure is provided, and FIG. 2 is a schematic flowchart of the first embodiment of the text detection method. The text detection method described in one embodiment includes the following steps:

101. Obtain edge information of a to-be-detected image.

In some optional implementations, before an input to-be-detected image is received and edge information of the to-be-detected image is obtained, denoising, stretching and other processing can be performed on the to-be-detected image. For example, convolution is performed on the to-be-detected image and a Gaussian smoothing template, so as to remove pixel noise by filtration. When the width or height of the to-be-detected image is less than a particular threshold (such as 400 pixels), the to-be-detected image is stretched, so that spacing between characters can be increased when the to-be-detected image include characters, thereby avoiding adhesion between characters.

In some optional implementations, before an input to-be-detected image is received and edge information of the to-be-detected image is obtained, the to-be-detected image can be converted into a gray level image. A gray level histogram of the to-be-detected image is obtained, and an image type of the to-be-detected image is determined by collecting statistics about distribution of pixel values in the gray level histogram of the to-be-detected image. The image type includes a simple text-graph combination type having features such as a simple background, clear writing, and a high contrast ratio, and a complex text-graph combination type having features such as a complex background, a low contrast ratio, a complex character layout, and inconsistent character specifications. Generally, distribution of the pixel values in a gray level histogram of a simple text-graph combination type generally meets similar features: the quantity of pixels corresponding to a particular pixel value is obviously higher than the quantities of pixels corresponding to other pixel values, while the complex text-graph combination type does not have such a feature. As such, after statistics about the distribution of pixel values in the gray level histogram of the to-be-detected image are collected, it can be determined whether the quantity of pixels corresponding to a particular pixel value is greater than the quantities of pixels corresponding to other pixel values by several orders of magnitude (for example, three orders of magnitude or more) in the gray level histogram of the to-be-detected image, or whether a proportion of the quantity of pixels corresponding to a particular pixel value to the total quantity of pixels in the to-be-detected image reaches a particular value (such as 90%). If the quantity of pixels corresponding to a particular pixel value is greater than the quantities of pixels corresponding to other pixel values by several orders of magnitude or a proportion of the quantity of pixels corresponding to a particular pixel value to the total quantity of pixels in the to-be-detected image reaches a particular value, it can be determined that the to-be-detected image is a simple text-graph combination type; otherwise, it can be determined that the to-be-detected image is a complex text-graph combination type.

Figures 1, 3:
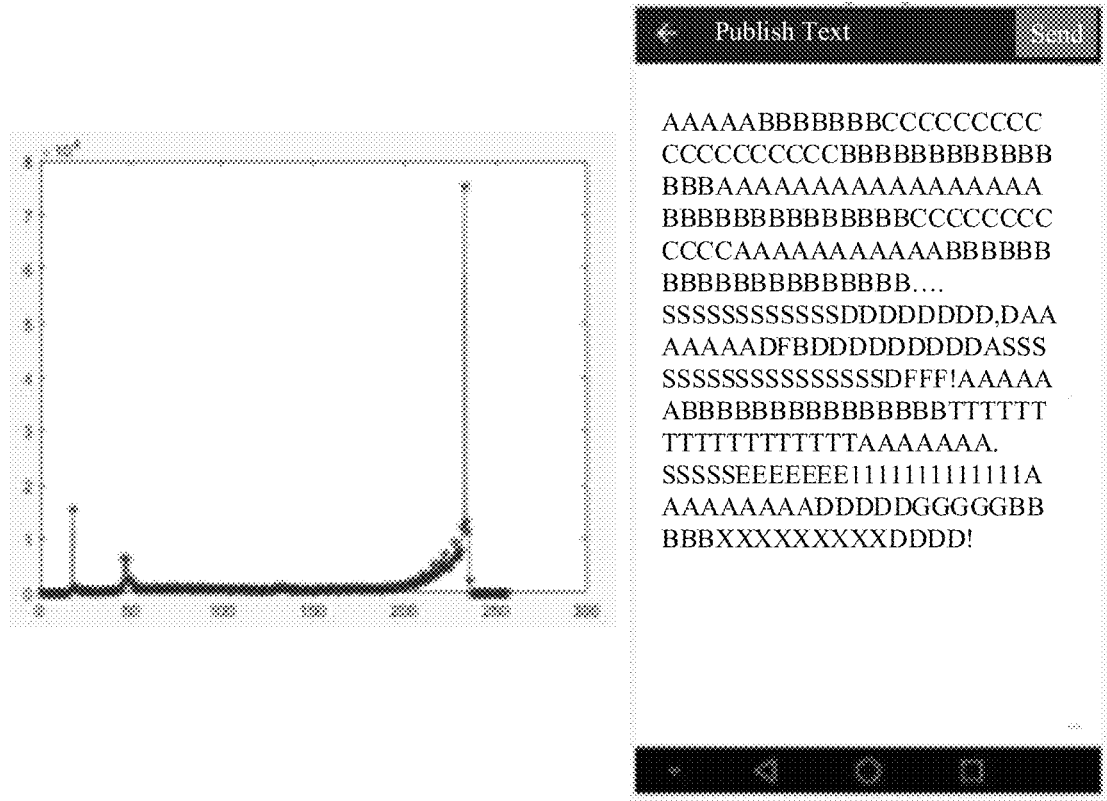
Figures 2, 3:
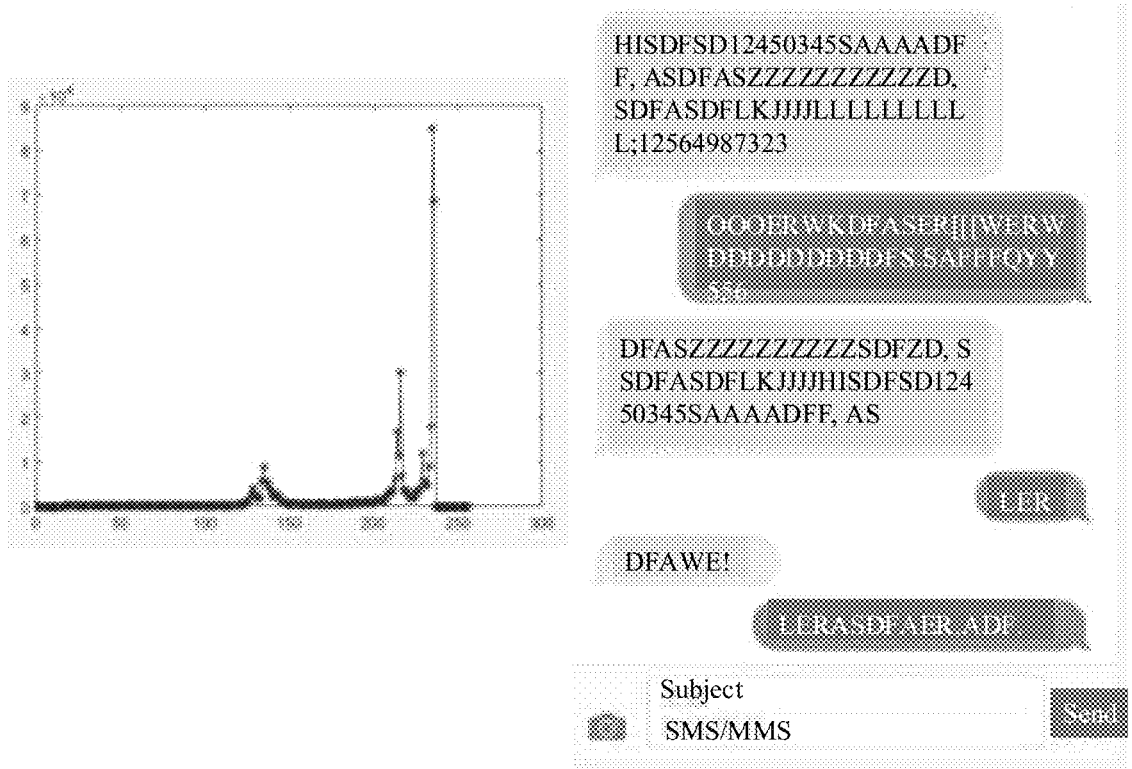
Figure 3:
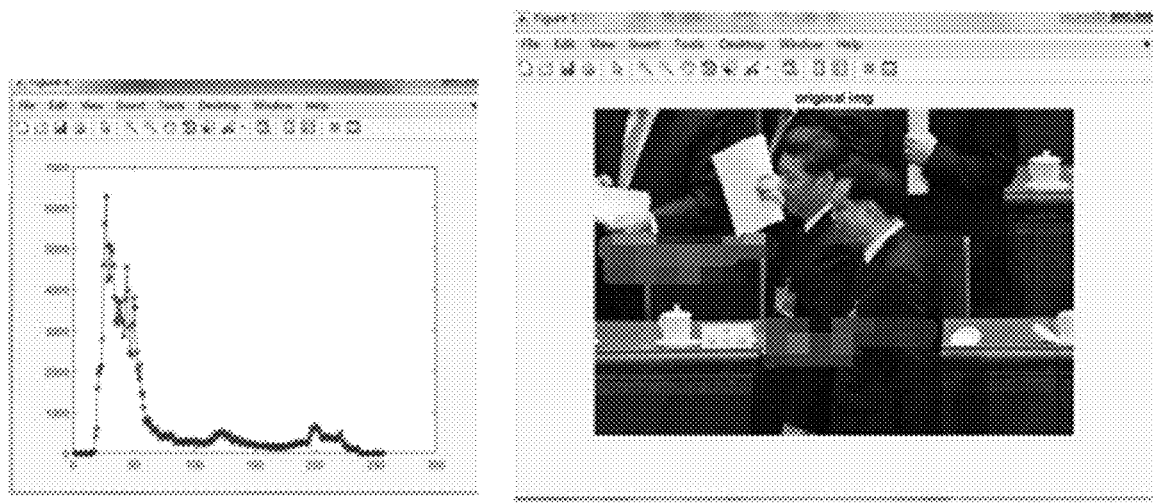

As shown in FIG. 3-1, the picture on the right is an original image, and the picture on the left is a corresponding gray level histogram. According to the quantity of pixels corresponding to each pixel value in the gray level histogram, it can be known that the quantity of pixels corresponding to one pixel value is greater than the quantities of pixels corresponding to other pixel values by several orders of magnitude. Therefore, it is determined that the picture on the right is a simple text-graph combination type. Similarly, as shown in FIG. 3-2, the picture on the right is also a simple text-graph combination type.

Figures 3, 4:
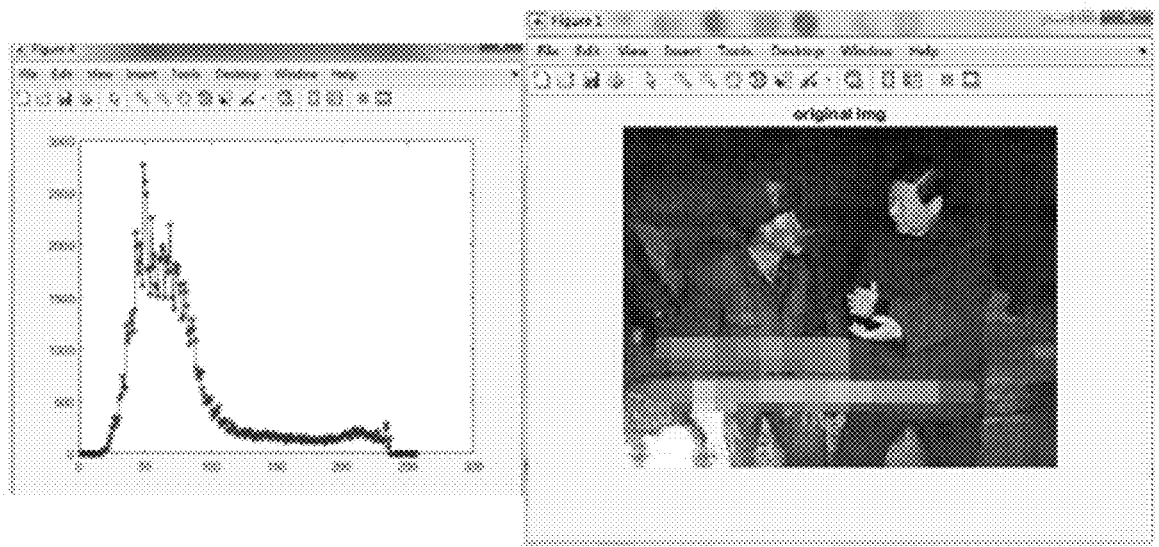

As shown in FIG. 3-3, the picture on the right is an original image, and the picture on the left is a corresponding gray level histogram. According to the quantity of pixels corresponding to each pixel value in the gray level histogram, it can be known that the quantities of pixels corresponding to multiple pixel values are close to each other. There is no pixel value whose quantity of corresponding pixels is greater than the quantities of pixels corresponding to other pixel values by several orders of magnitude. Therefore, it is determined that the picture on the right is a complex text-graph combination type. Similarly, as shown in FIG. 3-4, the picture on the right is also a complex text-graph combination type.

Figures 3, 4, 5:
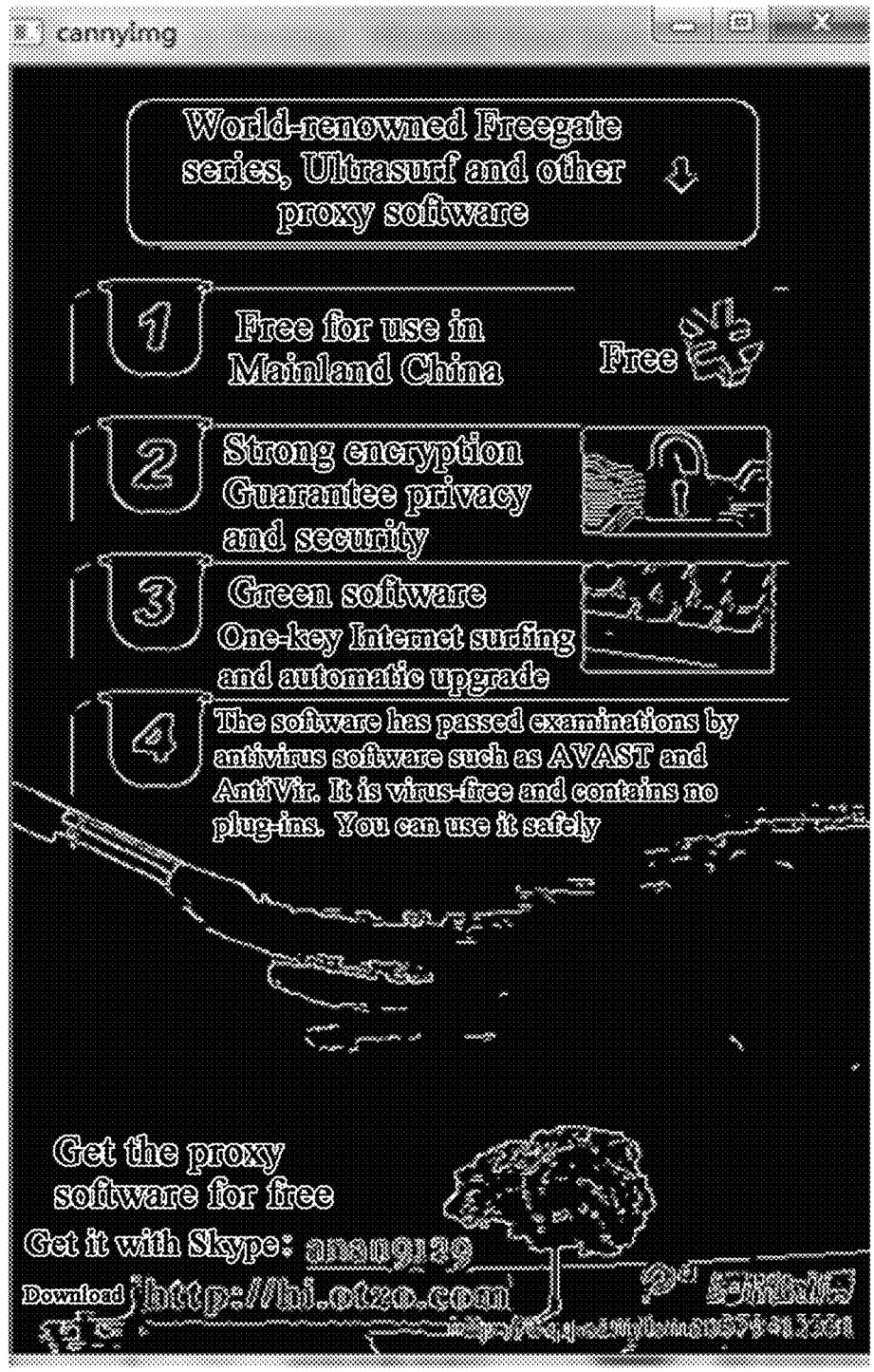

In specific implementation, the edge information of the to-be-detected image can be obtained by using a canny edge detection algorithm. If the to-be-detected image is a simple text-graph combination type, the edge information of the to-be-detected image is obtained by using a low threshold (first edge detection threshold), so as to extract richer edge information. If the to-be-detected image is a complex text-graph combination type, the edge information of the to-be-detected image is obtained by using a high threshold (second edge detection threshold), so as to reduce interference from a background edge. The first edge detection threshold is less than the second edge detection threshold. For example, if the original image of the to-be-detected image is as shown in FIG. 3-8, the obtained edge information of the to-be-detected image can be as shown in FIG. 3-5, that is, the white contour in FIG. 3-5.

102. Determine candidate text pixels in the to-be-detected image according to the edge information of the to-be-detected image by using a preset candidate text pixel determining strategy.

The edge information of the to-be-detected image includes position distribution information of the edge pixels of the to-be-detected image.

In specific implementation, each edge pixel of the to-be-detected image is determined according to the position distribution information of the edge pixels in the edge information of the to-be-detected image. The preset candidate text pixel determining strategy may be as follows: pre-defining a cross with a height of 2 h pixels and a width of 2 w pixels; in each image region (namely, cross) that uses an edge pixel (e.g., a first edge pixel) as a center and has a width of w pixels to the left and right and a height of h pixels above and below, querying the quantity of other edge pixels; if the image region having a width of w pixels to the left and right has at least one other edge pixel and the image region having a height of h pixels above and below also has at least one other edge pixel, determining the corresponding edge pixel (e.g., the first edge pixel) as a candidate text pixel; otherwise, determining the corresponding edge pixel as an interfering edge pixel and removing the corresponding edge pixel by filtration. As such, candidate text pixels can be marked rapidly and accurately, and interfering edge pixels can be removed by filtration. The effect is as shown in FIG. 3-6.

The height and width of the foregoing cross can be, for example, ⅕ of the height and width of the to-be-detected image.

103. Perform projection based segmentation on the candidate text pixels, and determine one or more text regions in the to-be-detected image according to a projection based segmentation result.

In specific implementation, horizontal projection based segmentation and vertical projection based segmentation can be performed on the candidate text pixels in the to-be-detected image; non-text rows and non-text columns are set to null, so as to remove a non-text region to obtain multiple rectangular frames containing texts. Specifically, horizontal projection based segmentation and vertical projection based segmentation can be performed multiple times, so as to remove as many non-text regions as possible. Projection based segmentation, as used herein, refers to a method that tallies pixel values in a region (e.g., a row, a column, a block with a predetermined size) and divides/segments pixels in the region into two groups based on whether the corresponding pixel value passes a threshold value. For example, an image or an image region may be binarized based on histogram of the image or image region, the threshold used in binarizing the image or image region may be used as the threshold value to divide the pixels into two groups.

In an optional implementation, some rectangular frames not meeting a given requirement can be removed by filtration based on a preset height, width and aspect ratio. For example, rectangular frames having a width or height less than 12 pixels need to be removed by filtration, and rectangular frames having an aspect ratio greater than 5 need to be removed by filtration, so that the text region in the to-be-detected image can be obtained accurately. The effect is as shown by rectangular frames in FIG. 3-7. Text regions obtained according to a detection result are mapped back to the original image shown in FIG. 3-8. It can be seen that all the text regions are detected.

In one embodiment of the present disclosure, edge information of a to-be-detected image can be obtained; candidate text pixels in the to-be-detected image are determined according to the edge information of the to-be-detected image by using a preset candidate text pixel determining strategy; projection based segmentation is performed on the candidate text pixels, and then a text region in the to-be-detected image can be determined according to a projection based segmentation result. As such, the accuracy of text detection can be improved, and high robustness is achieved. Moreover, the speed of text detection can be improved, and the method is applicable to application scenarios such as real-time processing and big data processing.

Referring to FIG. 4, FIG. 4 is a schematic flowchart of a second embodiment of a text detection method according to an embodiment of the present disclosure. The text detection method described in one embodiment includes the following steps:

301. A server obtains edge information of a to-be-detected image.

In specific implementation, the server can obtain edge information of a to-be-detected image by using a canny edge detection algorithm. If the to-be-detected image is a simple text-graph combination type, the edge information of the to-be-detected image is obtained by using a low threshold (first edge detection threshold), so as to extract richer edge information. If the to-be-detected image is a complex text-graph combination type, the edge information of the to-be-detected image is obtained by using a high threshold (second edge detection threshold), so as to reduce interference from a background edge. The first edge detection threshold is less than the second edge detection threshold. For example, if the original image of the to-be-detected image is as shown in FIG. 3-8, the obtained edge information of the to-be-detected image can be as shown in FIG. 3-5, that is, the white contour in FIG. 3-5.

302. The server determines candidate text pixels in the to-be-detected image according to the edge information of the to-be-detected image by using a preset candidate text pixel determining strategy.

In specific implementation, the server determines each edge pixel of the to-be-detected image according to position distribution information of edge pixels in the edge information of the to-be-detected image. The preset candidate text pixel determining strategy may be as follows: pre-defining a cross with a height of 2 h pixels and a width of 2 w pixels; in each image region (namely, cross) that uses an edge pixel as a center and has a width of w pixels to the left and right and a height of h pixels above and below, querying, by the server, the quantity of other edge pixels; if the image region having a width of w pixels to the left and right has at least one other edge pixel and the image region having a height of h pixels above and below also has at least one other edge pixel, determining the corresponding edge pixel as a candidate text pixel; otherwise, determining the corresponding edge pixel as an interfering edge pixel and removing the corresponding edge pixel by filtration. As such, candidate text pixels can be marked rapidly and accurately, and interfering edge pixels can be removed by filtration. The effect is as shown in FIG. 3-6.

303. The server performs horizontal projection based segmentation on the candidate text pixels by using a first cutting threshold to obtain an initial candidate text region. A cutting threshold, as used herein, may refer to a quantity threshold configured for pixels whose pixel values satisfies a certain condition (e.g., in a binarized image, the cutting threshold may refer to a quantity threshold for pixels whose values are 0 or 1; in a gray level image, the cutting threshold may refer to a quantity threshold for pixels whose values are greater than a certain value or less than or equal to the certain value).

In specific implementation, the server performs horizontal projection based segmentation on the candidate text pixels (e.g., travers the candidate text pixels by rows) to obtain one or more valid rows, including: obtaining the quantity of projection points of each row, determining a row in which the quantity of projection points is greater than or equal to the first cutting threshold as a valid row, determining a row in which the quantity of projection points is less than the first cutting threshold as an invalid row, and merging vertically consecutive valid rows, and disconnecting invalid rows, thereby obtaining initial candidate text regions in the to-be-detected image. A projection point, as used herein, may refer to a pixel whose pixel value (e.g., gray level) satisfies certain condition corresponding to the projection based segmentation (e.g., belonging to a group whose pixel values are all above certain level). As shown in FIG. 5-1, the rectangular frames are initial candidate text regions. The first cutting threshold can be, for example, $\frac{1}{10}$ of the width of the to-be-detected image. For example, if the width of the to-be-detected image is 101 pixels, the first cutting threshold can be 10.

In addition, a row in which the quantity of projection points changes abruptly also needs to be disconnected. For example, if the quantities of projection points of the previous 10 rows all range from 100 to 200, and the quantity of projection points in the current row is less than 50, the current row should also be disconnected.

304. The server performs vertical projection based segmentation on candidate text pixels in the initial candidate text region by using a second cutting threshold and/or third cutting threshold, and performs, by using a fourth cutting threshold and/or fifth cutting threshold, horizontal projection based segmentation on candidate text pixels in the initial candidate text region obtained after the vertical projection based segmentation, to obtain a target candidate text region.

The server can perform vertical projection based segmentation on the result (that is, each initial candidate text region) of the horizontal projection based segmentation by using high and low dual thresholds adaptively.

In specific implementation, it is assumed that the second cutting threshold is a low threshold, and the third cutting threshold is a high threshold. The second cutting threshold specifically includes a projection point threshold and a column threshold. The projection point threshold can be 1, and the column threshold can be $\frac{1}{3}$ of the height of the initial candidate text region. The server first performs vertical projection based segmentation by using the low threshold (that is, the second cutting threshold) to address the situation where the projection is not interfered. The vertical projection based segmentation specifically includes: obtaining the quantity of projection points of each column; determining a column in which the quantity of projection points is less than the projection point threshold as a candidate non-text column; when the quantity of consecutive candidate non-text columns exceeds the column threshold, determining all the candidate non-text columns as non-text columns; and setting the non-text columns to null.

In an optional embodiment, if there is no column in which the quantity of projection points is less than the projection point threshold, the server then performs vertical projection based segmentation by using the high threshold (that is, the third cutting threshold) to address the situation where the projection is interfered. The third cutting threshold also specifically includes a projection point threshold and a column threshold. The projection point threshold can be $\frac{1}{10}$ of the height of the initial candidate text region, and the column threshold can be $\frac{1}{5}$ of the height of the initial candidate text region. The vertical projection based segmentation specifically includes: obtaining the quantity of projection points of each column; determining a column in which the quantity of projection points is less than the projection point threshold as a candidate non-text column; when the quantity of consecutive candidate non-text columns exceeds the column threshold, determining all the candidate non-text columns as non-text columns; and setting the non-text columns to null. The effect after the vertical projection based segmentation is performed by using the high and low dual thresholds adaptively is as shown in FIG. 5-2.

In an optional embodiment, after performing vertical projection based segmentation on the candidate text pixels in the initial candidate text region, the server can perform, by using high and low dual thresholds adaptively, horizontal projection based segmentation on candidate text pixels in each initial candidate text region obtained after the vertical projection based segmentation, so as to obtain a target candidate text region. A specific implementation process is similar to the process of performing vertical projection based segmentation by using high and low dual thresholds adaptively, and the only difference is that the projection manner becomes horizontal projection. It is assumed that the fourth cutting threshold is a low threshold and the fifth cutting threshold is a high threshold. The fourth cutting threshold specifically includes a projection point threshold and a row threshold. In this case, the projection point threshold can be 1, and the row threshold can be ⅓ of the width of the initial candidate text region obtained after the vertical projection based segmentation. The fifth cutting threshold also specifically includes a projection point threshold and a row threshold. In this case, the projection point threshold can be 1/10 of the width of the initial candidate text region obtained after the vertical projection based segmentation, and the row threshold can be ⅕ of the width of the initial candidate text region obtained after the vertical projection based segmentation. Similarly, the server first performs horizontal projection based segmentation by using the low threshold (that is, the fourth cutting threshold) to address the situation where the projection is not interfered. If there is no row in which the quantity of projection points is less than the projection point threshold, the server then performs horizontal projection based segmentation by using the high threshold (that is, the fifth cutting threshold) to address the situation where the projection is interfered. The effect after the horizontal projection based segmentation is performed by using the high and low dual thresholds adaptively is as shown in FIG. 5-3.

In some optional implementations, the server can perform secondary vertical projection based segmentation and horizontal projection based segmentation on the obtained target candidate text region by using the method in step 304, so as to delete blank regions and obtain a more accurate text region.

In some optional implementations, the server can perform vertical projection based segmentation by adaptively using high and low dual thresholds in combination with a geometric position constraint of the candidate text pixels in the initial candidate text region. A column in which the geometric position constraint changes abruptly can be regarded as an interfering column and set to null. In this case, the geometric position constraint can include at least one of the following: a maximum distance between two consecutive candidate text pixels in the initial candidate text region, a maximum distance between a highest candidate text pixel and a lowest candidate text pixel in the initial candidate text region, and a position of the highest candidate text pixel as well as a position of the lowest candidate text pixel in the initial candidate text region.

In some optional implementations, the server can perform horizontal projection based segmentation by adaptively using high and low dual thresholds in combination with a geometric position constraint of the candidate text pixels in the initial candidate text region. A row in which the geometric position constraint changes abruptly can be regarded as an interfering row and set to null. In this case, the geometric position constraint can include at least one of the following: a maximum distance between two consecutive candidate text pixels in the initial candidate text region obtained after the vertical projection based segmentation, a maximum distance between a leftmost candidate text pixel and a rightmost candidate text pixel in the initial candidate text region obtained after the vertical projection based segmentation, and a position of the leftmost candidate text pixel as well as a position of the rightmost candidate text pixel in the initial candidate text region obtained after the vertical projection based segmentation

305. The server removes a non-text region in the target candidate text region by filtration using a preset non-text region filtering strategy, and uses a remaining region in the target candidate text region as one of the one or more text regions in the to-be-detected image (e.g., determined in S103).

The preset non-text region filtering strategy specifically can include a preset height, width, aspect ratio, and the like.

In specific implementation, the server can remove non-text regions in the target candidate text region by filtration based on a preset height, width and aspect ratio. For example, regions having a width or height less than 12 pixels need to be removed by filtration, and regions having an aspect ratio greater than 5 need to be removed by filtration. A remaining region in the target candidate text region is used as a text region in the to-be-detected image. As such, the text region in the to-be-detected image can be obtained accurately. The effect is as shown by rectangular frames in FIG. 3-7. Text regions obtained according to a detection result are mapped back to the original image shown in FIG. 3-8. It can be seen that all the text regions are detected.

306. The server performs row merging processing on one or more text regions according to position information of the one or more text regions. That is, the server merges the one or more text regions by rows to obtain at least one row-merged text region.

The position information of the text region includes a distance between boundaries of two adjacent text regions.

In specific implementation, the server can merge two or more text regions whose boundaries are relatively close to each other (for example, less than or equal to 3 times the row height of the text region) in the horizontal direction, to obtain as many connected text regions as possible, thereby reducing omission of characters in rows of the text regions.

307. The server inputs the row-merged text region to a text detection model trained in advance, and predicts a refined text region in the row-merged text region by using the text detection model.

In specific implementation, the server can input the detected text region to a text detection model, so as to further remove non-text regions by filtration. The effect is as shown in FIG. 5-4. Numerous positive samples of text row pictures and negative samples of non-text row pictures can be obtained through artificial synthesis, and training can be performed based on the obtained samples. Specifically, training can be performed by using a caffe framework. A Convolutional Neural Network (CNN)-based text detection model is constructed based on a LeNet-5 model. The step of removing non-text regions by filtration using the text detection model takes a small proportion of time, and can effectively remove non-text region by filtration, thereby further improving the accuracy of text detection.

It can be understood that the text detection result (that is, the text region) obtained in one embodiment of the present disclosure can be used for subsequent text recognition, can also be used for rapidly classifying images into text images and non-text images according to the number of detected text regions (for example, the rectangular frames in FIG. 5-4), and can further be used for screening effective features of an image according to position information of the text region in the image, so that features of the image are only focused on the text region or non-text region.

In one embodiment of the present disclosure, the server can obtain edge information of a to-be-detected image; determines candidate text pixels in the to-be-detected image according to the edge information of the to-be-detected image by using a preset candidate text pixel determining strategy; perform horizontal projection based segmentation on the candidate text pixels by using a first cutting threshold to obtain an initial candidate text region; first perform vertical projection based segmentation on candidate text pixels in the initial candidate text region by using a second cutting threshold and/or third cutting threshold, and then perform, by using a fourth cutting threshold and/or fifth cutting threshold, horizontal projection based segmentation on candidate text pixels in the initial candidate text region obtained after the vertical projection based segmentation, to obtain a target candidate text region; and remove a non-text region in the target candidate text region by filtration using a preset non-text region filtering strategy, and use a remaining region in the target candidate text region as a text region in the to-be-detected image. The server can further perform row merging processing on the text region according to position information of the text region, and then input the row-merged text region to a text detection model trained in advance, so as to remove non-text regions in the text region by filtration. As such, the accuracy of text detection can be improved, and high robustness is achieved. Moreover, the speed of text detection can be improved, and the method is applicable to application scenarios such as real-time processing and big data processing.

Figures 3, 4, 5, 6:
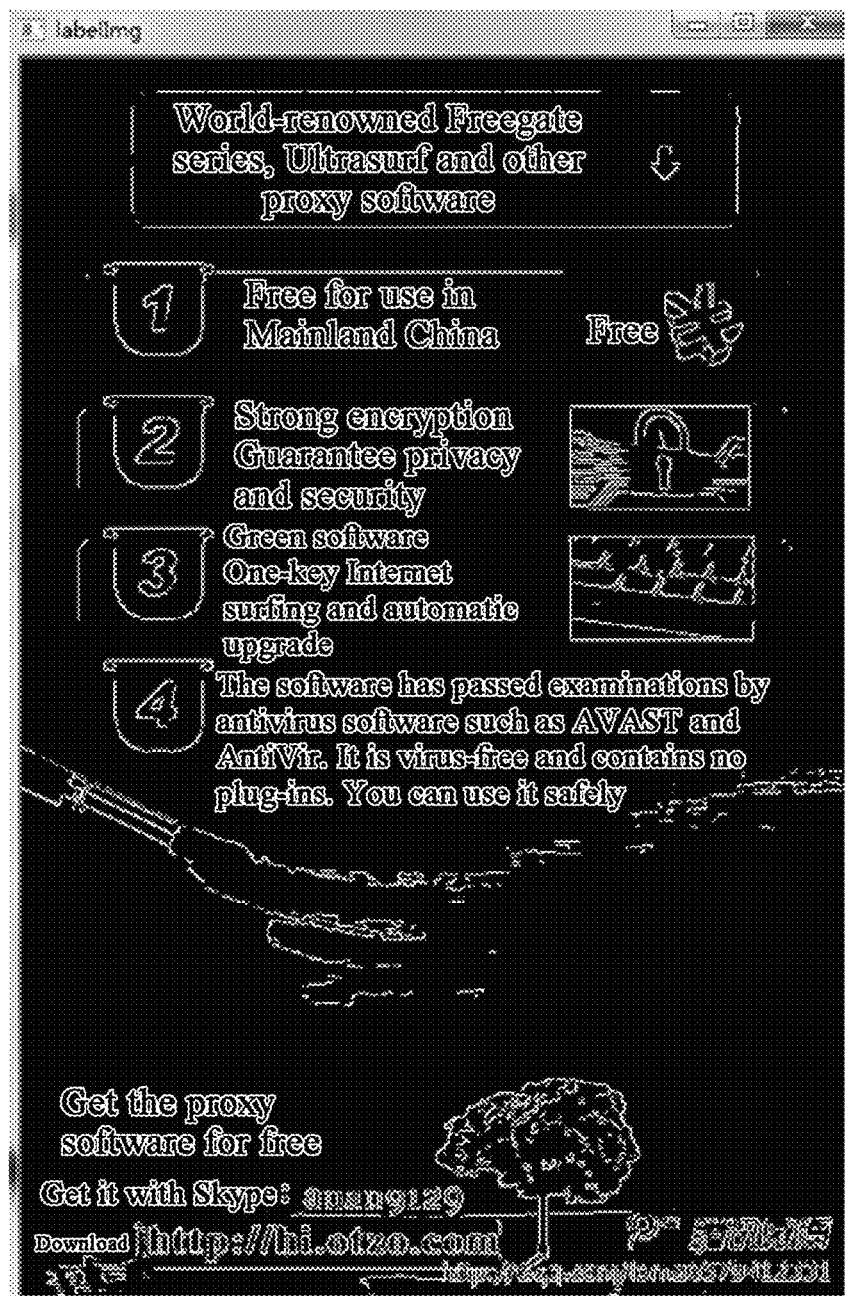

Referring to FIG. 6, FIG. 6 is a schematic structural diagram of a text detection apparatus according to an embodiment of the present disclosure. The text detection apparatus described in one embodiment includes:

an obtaining module 501, configured to obtain edge information of a to-be-detected image;

a determining module 502, configured to determine candidate text pixels in the to-be-detected image according to the edge information of the to-be-detected image by using a preset candidate text pixel determining strategy; and a projection based segmentation module 503, configured to perform projection based segmentation on the candidate text pixels;

where the determining module 502 is further configured to determine a text region in the to-be-detected image according to a projection based segmentation result.

In some optional implementations, the apparatus further includes:

a merging module 504, configured to perform row merging processing on the text region according to position information of the text region; and a filtering module 505, configured to input the row-merged text region to a text detection model trained in advance, and predict a refined text region in the row-merged text region by using the text detection model.

In some optional implementations, the apparatus further includes:

a statistics collection module 506, configured to collect statistics about distribution of pixel values in a gray level histogram of the to-be-detected image.

The determining module 502 is further configured to determine an image type of the to-be-detected image according to the distribution.

The obtaining module 501 is configured to:

obtain the edge information of the to-be-detected image by using a first edge detection threshold if the image type of the to-be-detected image is simple text-graph combination type; and obtain the edge information of the to-be-detected image by using a second edge detection threshold if the image type of the to-be-detected image is complex text-graph combination type;

where the first edge detection threshold is less than the second edge detection threshold.

In some optional implementations, the determining module 502 is configured to:

determine edge pixels of the to-be-detected image according to the edge information of the to-be-detected image; and determine target edge pixels in the edge pixels of the to-be-detected image as candidate text pixels;

where other edge pixels exist in an image region that uses the target edge pixel as a center and has a width of w pixels to the left and right and a height of h pixels above and below, and w and h are both positive integers.

In some optional implementations, the projection based segmentation module 503 is configured to:

perform horizontal projection based segmentation on the candidate text pixels by using a first cutting threshold to obtain an initial candidate text region;

perform vertical projection based segmentation on candidate text pixels in the initial candidate text region by using a second cutting threshold and/or third cutting threshold; and perform, by using a fourth cutting threshold and/or fifth cutting threshold, horizontal projection based segmentation on candidate text pixels in the initial candidate text region obtained after the vertical projection based segmentation, to obtain a target candidate text region.

The determining module 502 is configured to:

remove the non-text region in the target candidate text region by filtration using a preset non-text region filtering strategy, and use a remaining region in the target candidate text region as the text region in the to-be-detected image.

In some optional implementations, the projection based segmentation module 503 is further configured to:

perform horizontal projection based segmentation on the candidate text pixels, and determine a row in which the quantity of projection points is greater than or equal to the first cutting threshold as a valid row; and merge the valid rows to obtain the initial candidate text region.

In some optional implementations, the projection based segmentation module 503 is further configured to:

perform vertical projection based segmentation on the candidate text pixels in the initial candidate text region by using a geometric position constraint of the candidate text pixels in the initial candidate text region.

In some optional implementations, the geometric position constraint includes one or more of: a maximum distance between two consecutive candidate text pixels in the initial candidate text region; a maximum distance between a highest candidate text pixel and a lowest candidate text pixel in the initial candidate text region; a position of the highest candidate text pixel in the initial candidate text region; and a position of the lowest candidate text pixel in the initial candidate text region.

It can be understood that functions of the functional modules of the text detection apparatus in one embodiment can be specifically implemented according to the method in the foregoing method embodiment. For a specific implementation process, refer to the related description of the foregoing method embodiment. Details are not described here again.

According to one embodiment of the present disclosure, edge information of a to-be-detected image can be obtained; candidate text pixels in the to-be-detected image are determined according to the edge information of the to-be-detected image by using a preset candidate text pixel determining strategy; projection based segmentation is performed on the candidate text pixels, and then a text region in the to-be-detected image can be determined according to a projection based segmentation result. As such, the accuracy of text detection can be improved, and high robustness is achieved. Moreover, the speed of text detection can be improved, and the method is applicable to application scenarios such as real-time processing and big data processing.

Figures 3, 4, 5, 6, 7:
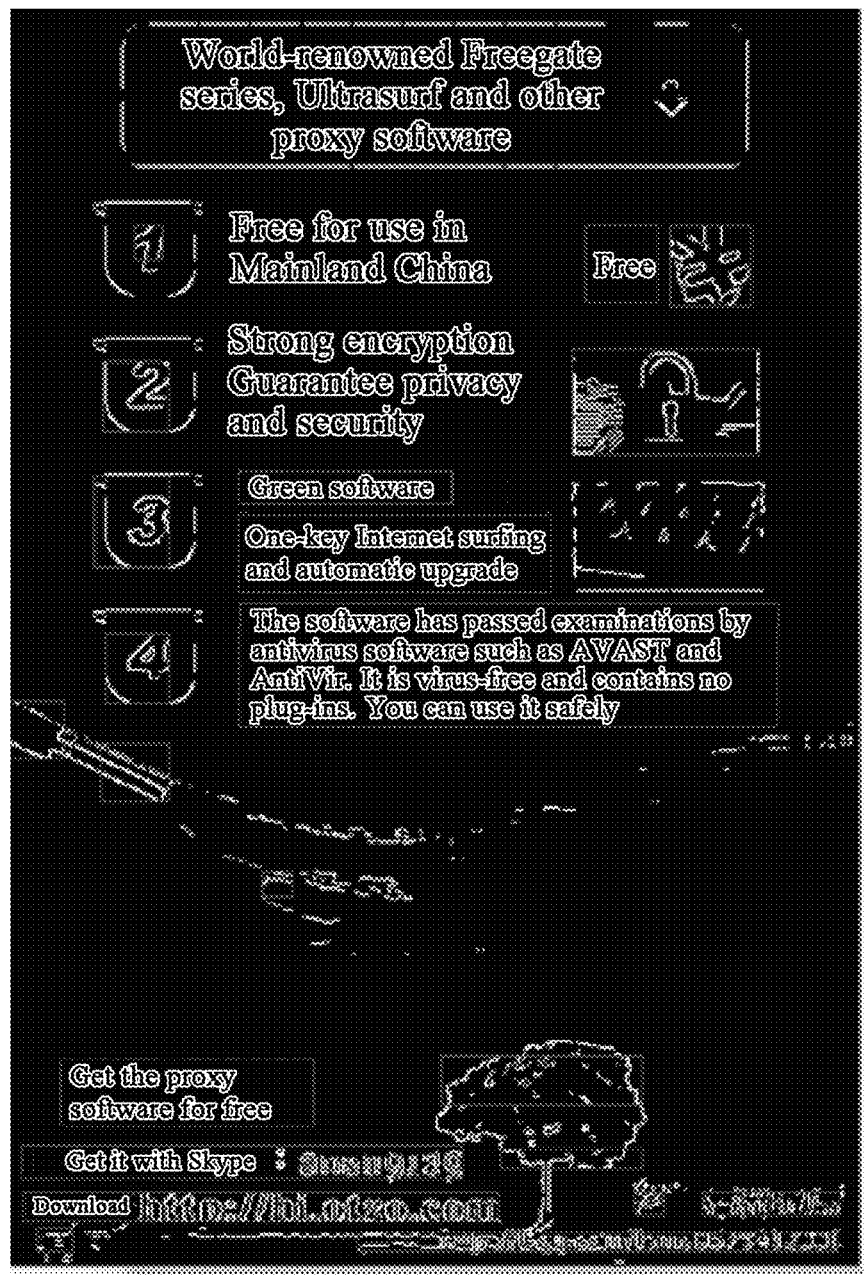
Figures 3, 4, 5, 6, 7, 8:
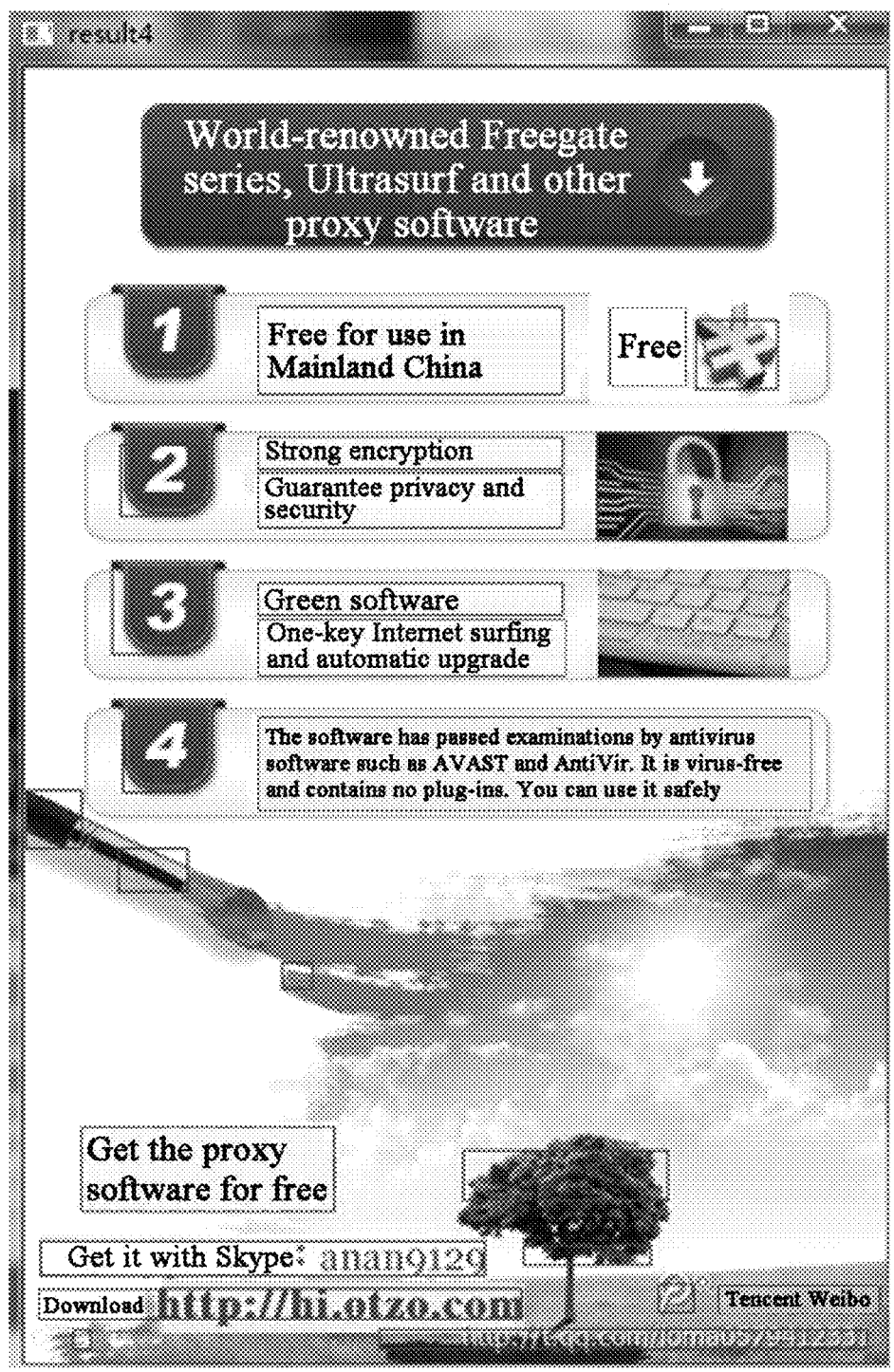
Figure 4:
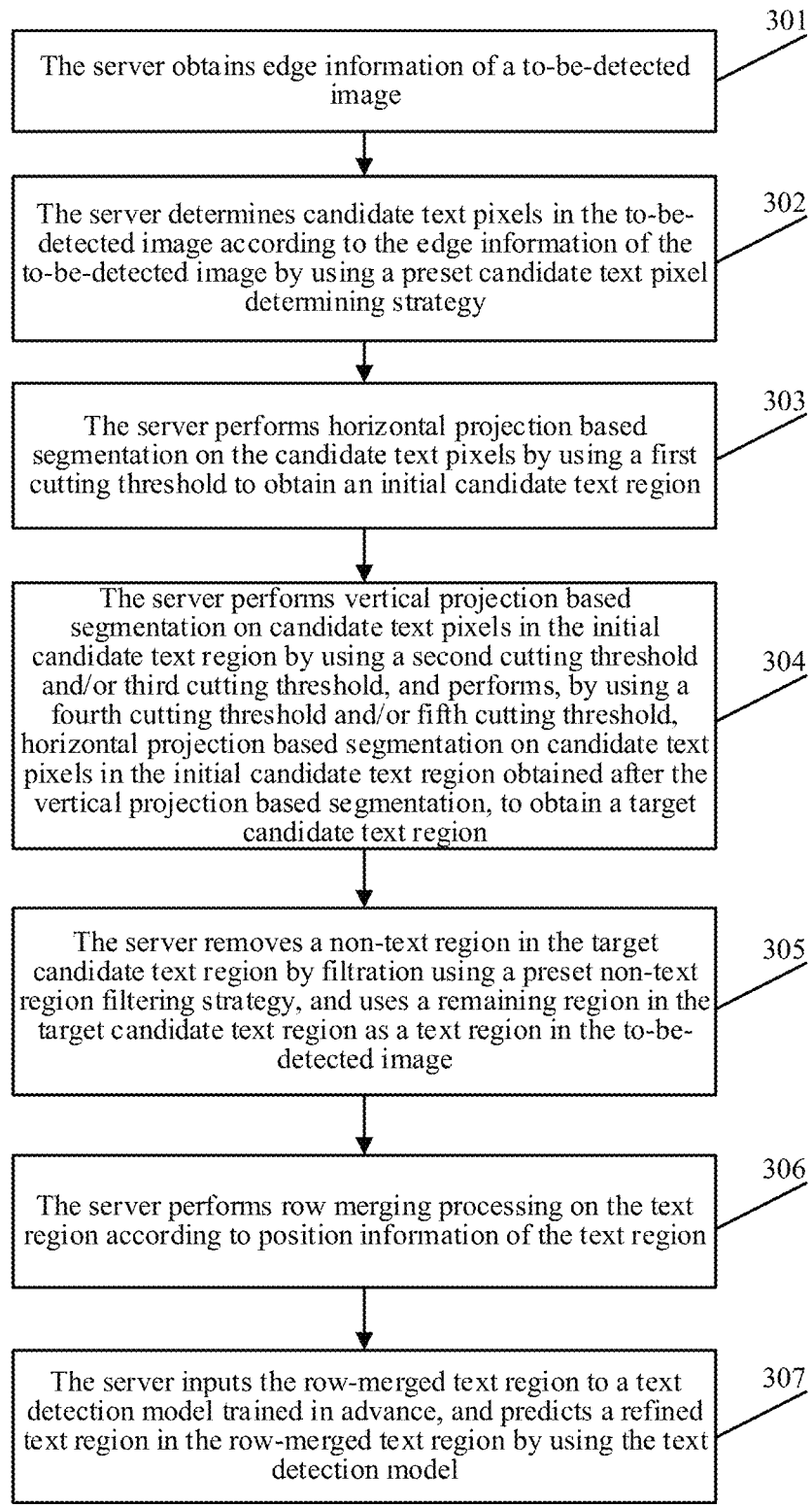
Figures 1, 5:
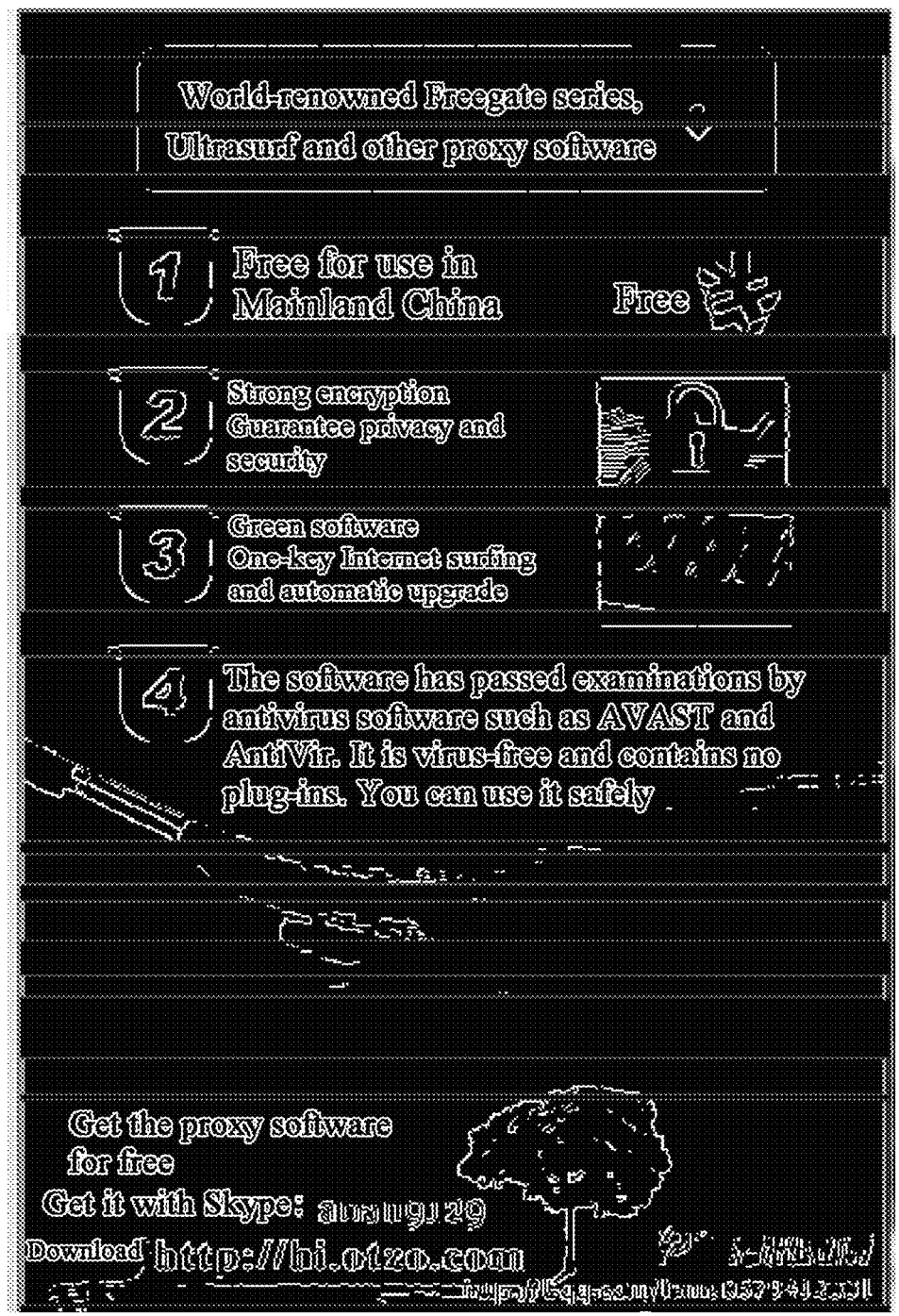
Figures 2, 5:
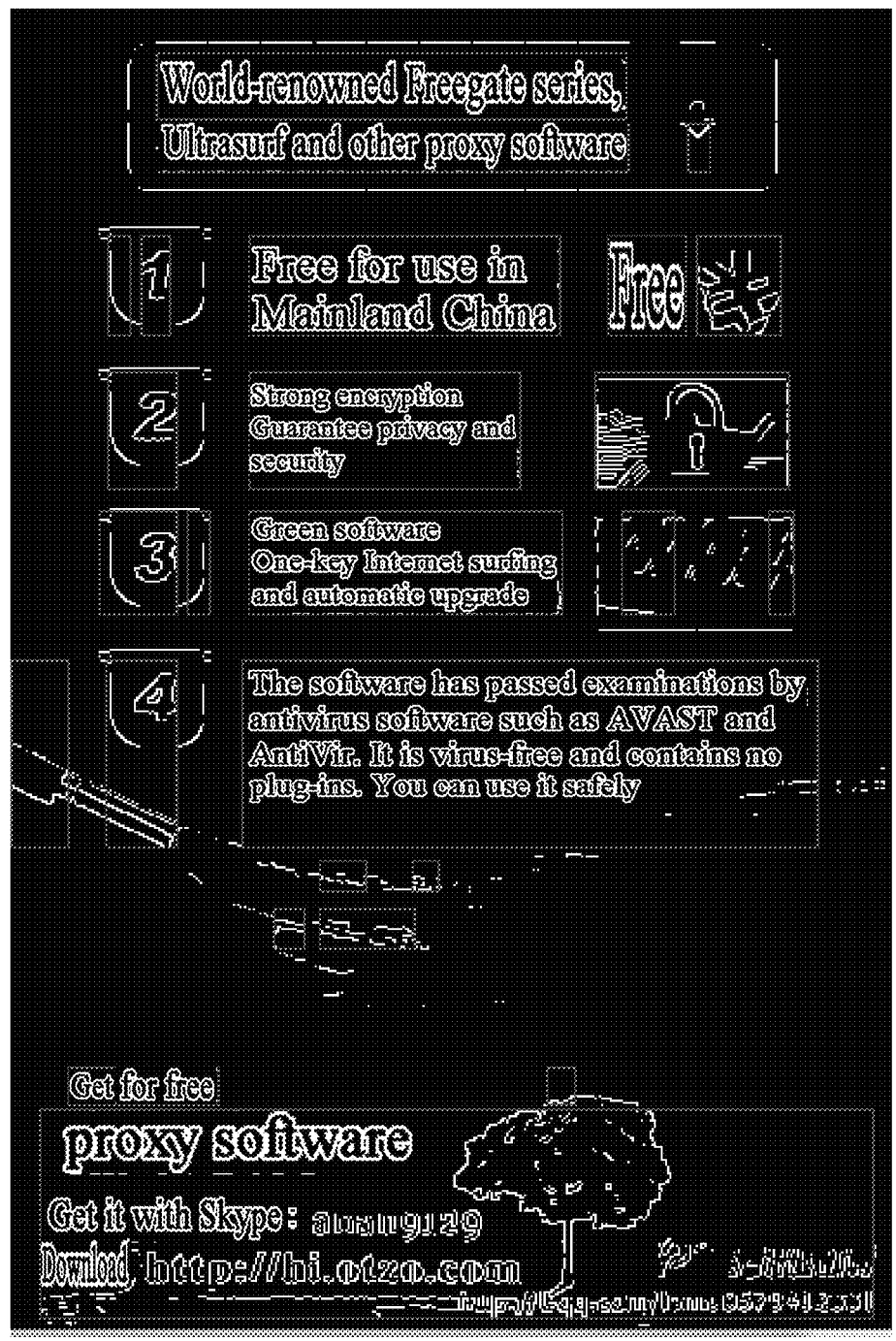
Figures 3, 5:
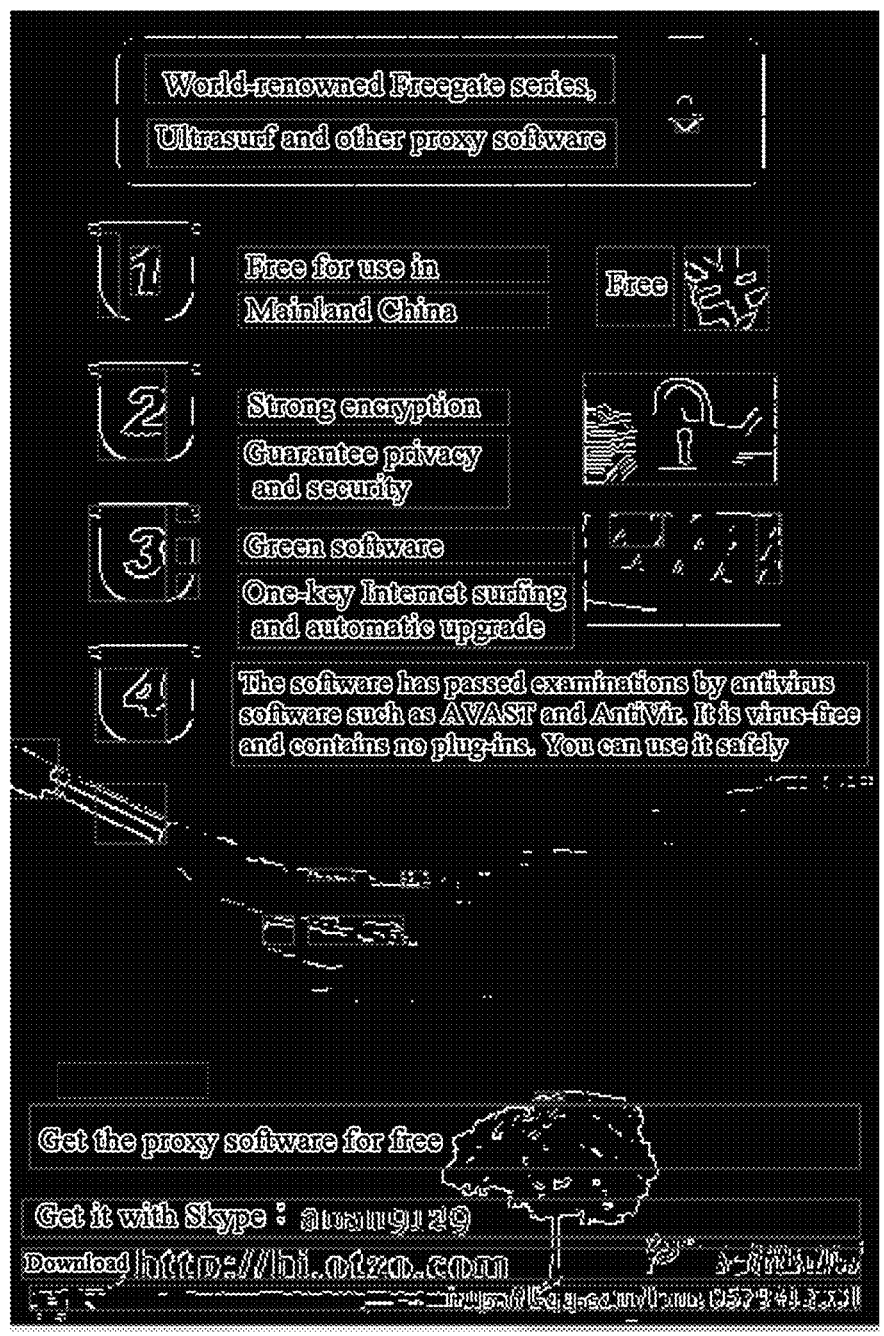
Figures 4, 5:
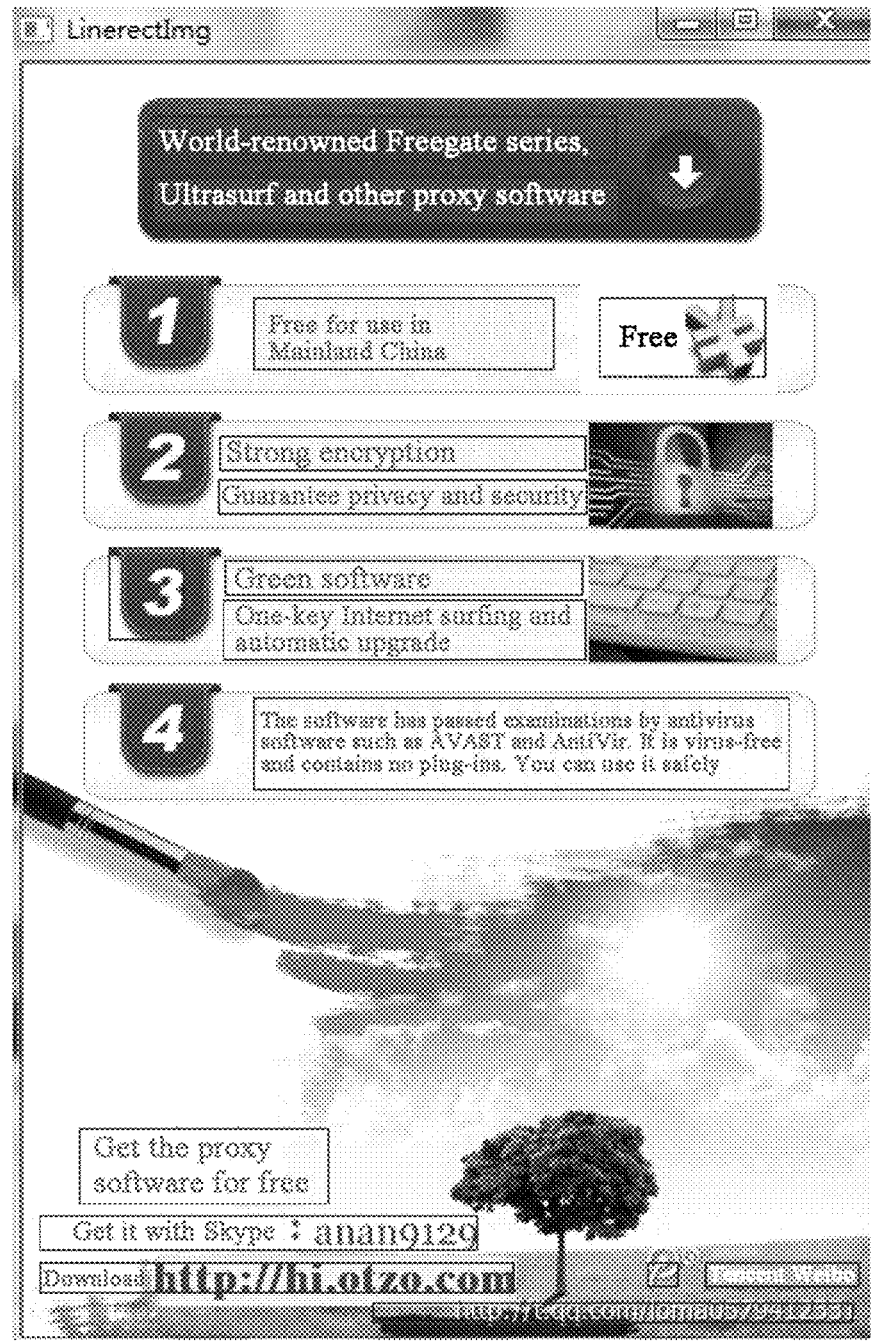
Figure 6:
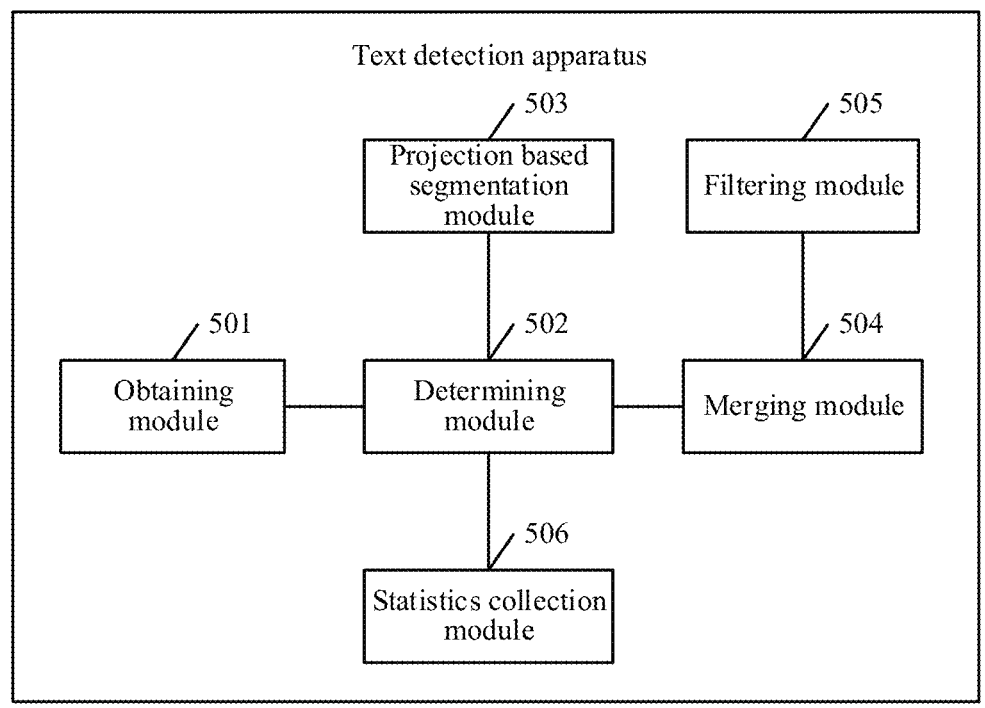
Figure 7:
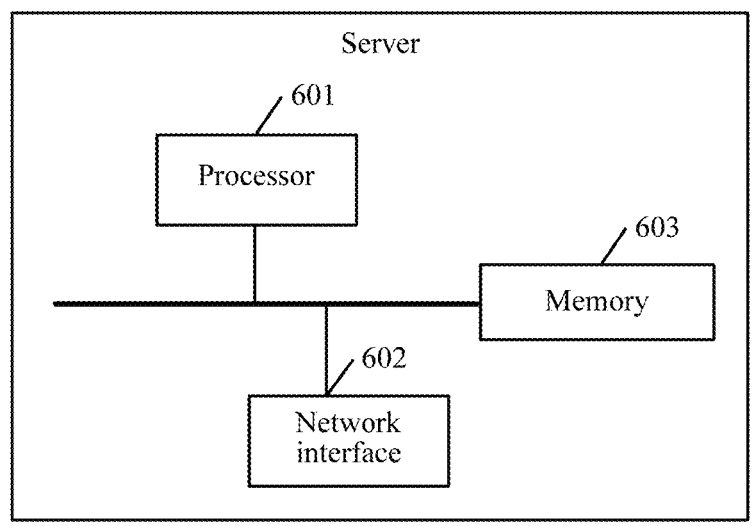

Referring to FIG. 7, FIG. 7 is a schematic structural diagram of a server according to an embodiment of the present disclosure. The server described in one embodiment includes: a processor 601, a network interface 602, and a memory 603. The processor 601, the network interface 602 and the memory 603 can be connected through a bus or in other manners. In one embodiment of the present disclosure, a bus connection is used as an example.

The processor 601 (or referred to as a Central Processing Unit (CPU)) is a computing core and control core of the server. The network interface 602 optionally can include a standard wired interface and a wireless interface (such as a Wi-Fi interface and a mobile communications interface), and is configured to sending and receiving data under the control of the processor 601. The memory 603 is a memory device of the server, and is configured to store programs and data. It can be understood that, the memory 603 here can be a high-speed random access memory (RAM), or a non-volatile memory, for example, at least one magnetic disk memory. Optionally, the memory 603 can also be at least one storage apparatuses far away from the processor 601. The memory 603 provides storage space that stores an operating system of the server and executable program code. The operating system of the server includes, but not limited to: Windows system (an operating system), Linux system (an operating system), and the like, which are not limited in the present disclosure.

In one embodiment of the present disclosure, the processor 601 performs the following operations by running the executable program code in the memory 603:

the processor 601 being configured to obtain edge information of a to-be-detected image;

the processor 601 being further configured to determine candidate text pixels in the to-be-detected image according to the edge information of the to-be-detected image by using a preset candidate text pixel determining strategy;

the processor 601 being further configured to perform projection based segmentation on the candidate text pixels; and the processor 601 being further configured to determine a text region in the to-be-detected image according to a projection based segmentation result.

In some optional implementations, the processor 601 is configured to perform row merging processing on the text region according to position information of the text region; and the processor 601 is further configured to input the row-merged text region to a text detection model trained in advance, so as to remove a non-text region in the row-merged text region by filtration.

In some optional implementations, the processor 601 is further configured to collect statistics about distribution of pixel values in a gray level histogram of the to-be-detected image; and the processor 601 is further configured to determine an image type of the to-be-detected image according to the distribution.

The processor 601 is configured to:

obtain the edge information of the to-be-detected image by using a first edge detection threshold if the image type of the to-be-detected image is simple text-graph combination type; and obtain the edge information of the to-be-detected image by using a second edge detection threshold if the image type of the to-be-detected image is complex text-graph combination type;

where the first edge detection threshold is less than the second edge detection threshold.

In some optional implementations, the processor 601 is further configured to:

determine edge pixels of the to-be-detected image according to the edge information of the to-be-detected image; and determine target edge pixels in the edge pixels of the to-be-detected image as candidate text pixels;

where other edge pixels exist in an image region that uses the target edge pixel as a center and has a width of w pixels to the left and right and a height of h pixels above and below, and w and h are both positive integers.

In some optional implementations, the processor 601 is configured to:

perform horizontal projection based segmentation on the candidate text pixels by using a first cutting threshold to obtain an initial candidate text region;

perform vertical projection based segmentation on candidate text pixels in the initial candidate text region by using a second cutting threshold and/or third cutting threshold; and perform, by using a fourth cutting threshold and/or fifth cutting threshold, horizontal projection based segmentation on candidate text pixels in the initial candidate text region obtained after the vertical projection based segmentation, to obtain a target candidate text region.

The processor 601 is configured to:

remove the non-text region in the target candidate text region by filtration using a preset non-text region filtering strategy, and use a remaining region in the target candidate text region as the text region in the to-be-detected image.

In some optional implementations, the processor 601 is further configured to:

perform horizontal projection based segmentation on the candidate text pixels, and determine a row in which the quantity of projection points is greater than or equal to the first cutting threshold as a valid row; and merge the valid rows to obtain the initial candidate text region.

In some optional implementations, the processor 601 is further configured to:

perform vertical projection based segmentation on the candidate text pixels in the initial candidate text region by using a geometric position constraint of the candidate text pixels in the initial candidate text region.

In some optional implementations, the geometric position constraint includes one or more of: a maximum distance between two consecutive candidate text pixels in the initial candidate text region; a maximum distance between a highest candidate text pixel and a lowest candidate text pixel in the initial candidate text region; a position of the highest candidate text pixel in the initial candidate text region; and a position of the lowest candidate text pixel in the initial candidate text region.

In specific implementation, the processor 601, network interface 602, and memory 603 described in one embodiment of the present disclosure can perform implementations described in the first embodiment and the second embodiment of the text detection method provided in the embodiments of the present disclosure, and can also perform the implementation described in the text detection apparatus provided in the embodiments of the present disclosure. Details are not described here again.

According to one embodiment of the present disclosure, edge information of a to-be-detected image can be obtained; candidate text pixels in the to-be-detected image are determined according to the edge information of the to-be-detected image by using a preset candidate text pixel determining strategy; projection based segmentation is performed on the candidate text pixels, and then a text region in the to-be-detected image can be determined according to a projection based segmentation result. As such, the accuracy of text detection can be improved, and high robustness is achieved. Moreover, the speed of text detection can be improved, and the method is applicable to application scenarios such as real-time processing and big data processing.

An embodiment of the present disclosure further provides a storage medium, storing an executable program, where the following operations are implemented when the executable program is executed by a processor:

obtaining edge information of a to-be-detected image;

determining candidate text pixels in the to-be-detected image according to the edge information of the to-be-detected image by using a preset candidate text pixel determining strategy; and performing projection based segmentation on the candidate text pixels, and determining a text region in the to-be-detected image according to a projection based segmentation result.

When the computer program is run by the processor, the following operation is further performed:

performing row merging processing on the text region according to position information of the text region.

When the computer program is run by the processor, the following operation is further performed:

inputting the row-merged text region to a text detection model trained in advance, and predicting a refined text region in the row-merged text region by using the text detection model.

When the computer program is run by the processor, the following operations are further performed:

collecting statistics about distribution of pixel values in a gray level histogram of the to-be-detected image; and determining an image type of the to-be-detected image according to the distribution.

When the computer program is run by the processor, the following operations are further performed:

obtaining the edge information of the to-be-detected image by using a first edge detection threshold when the image type of the to-be-detected image is simple text-graph combination type; and obtaining the edge information of the to-be-detected image by using a second edge detection threshold when the image type of the to-be-detected image is complex text-graph combination type;

where the first edge detection threshold is less than the second edge detection threshold.

When the computer program is run by the processor, the following operations are further performed:

determining edge pixels of the to-be-detected image according to the edge information of the to-be-detected image; and traversing each edge pixel, and when a region (e.g., the region may have a preset shape and size, such as a cross with 2-pixel width and height) centered around a first edge pixel includes other edge pixels, determining the first edge pixel as one of the candidate text pixels.

When the computer program is run by the processor, the following operations are further performed:

performing horizontal projection based segmentation on the candidate text pixels by using a first cutting threshold to obtain an initial candidate text region;

performing vertical projection based segmentation on candidate text pixels in the initial candidate text region by using a second cutting threshold and/or third cutting threshold;

performing, by using a fourth cutting threshold and/or fifth cutting threshold, horizontal projection based segmentation on candidate text pixels in the initial candidate text region obtained after the vertical projection based segmentation, to obtain a target candidate text region; and removing the non-text region in the target candidate text region by filtration using a preset non-text region filtering strategy, and using a remaining region in the target candidate text region as the text region in the to-be-detected image.

When the computer program is run by the processor, the following operations are further performed:

performing horizontal projection based segmentation on the candidate text pixels, and determining a row in which the quantity of projection points is greater than or equal to the first cutting threshold as a valid row; and merging the valid rows to obtain the initial candidate text region.

When the computer program is run by the processor, the following operation is further performed:

performing vertical projection based segmentation on the candidate text pixels in the initial candidate text region by using a geometric position constraint of the candidate text pixels in the initial candidate text region.

When the computer program is run by the processor, the following operations are further performed.

A person of ordinary skill in the art may understand that all or some of the processes of the methods in the foregoing embodiments may be implemented by a computer program instructing relevant hardware. The program may be stored in a computer-readable storage medium. When the program runs, the processes of the methods in the foregoing embodiments can be performed. The storage medium may be a non-volatile storage medium such as a magnetic disk, an optical disc, a read-only memory (ROM), a random access memory (RAM) or the like.

Disclosed above is merely a preferred embodiment of the present disclosure, which certainly is not intended to limit the protection scope of the present disclosure. A person of ordinary skill in the art can understand that equivalent variations implementing all or some of the processes of the foregoing embodiments and made in accordance with the claims of the present disclosure shall still fall within the scope of the present disclosure.

INDUSTRIAL APPLICABILITY

In the embodiments of the present disclosure, edge information of a to-be-detected image can be obtained; candidate text pixels in the to-be-detected image are determined according to the edge information of the to-be-detected image by using a preset candidate text pixel determining strategy; projection based segmentation is performed on the candidate text pixels, and then a text region in the to-be-detected image can be determined according to a projection based segmentation result. As such, the accuracy of text detection and the speed of text detection can be improved.

What is claimed is:

1. A text detection method, comprising:
   collecting, by a computing device, statistics on distribution of pixel values in a gray level histogram of an image;
   determining, by the computing device, an image type of the image according to statistics on the distribution of pixel values;
   obtaining, by the computing device, edge information of the image according to the image type of the image;
   determining, by the computing device, candidate text pixels in the image according to the edge information of the image by using a preset candidate text pixel determining strategy;
   performing, by the computing device, projection based segmentation on the candidate text pixels to obtain a projection based segmentation result; and
   determining, by the computing device, one or more text regions in the image according to the projection based segmentation result.

2. The method according to claim 1, wherein after the performing projection based segmentation on the candidate text pixels, and determining one or more text regions in the image according to the projection based segmentation result, the method further comprises:
   merging the one or more text regions by rows according to position information of the one or more text regions to obtain a row-merged text region.

3. The method according to claim 2, further comprising:
   inputting the row-merged text region to a text detection model trained in advance, and predicting a refined text region in the row-merged text region by using the text detection model.

4. The method according to claim 1, wherein the obtaining edge information of the image comprises:
   obtaining the edge information of the image by using a first edge detection threshold in response to determining the image type of the image is simple text-graph combination type; and
   obtaining the edge information of the image by using a second edge detection threshold in response to determining the image type of the image is complex text-graph combination type wherein the first edge detection threshold is less than the second edge detection threshold.

5. The method according to claim 1, wherein the determining candidate text pixels in the image according to the edge information of the image by using the preset candidate text pixel determining strategy comprises:
   determining edge pixels of the image according to the edge information of the image; and
   traversing each of the edge pixels, and in response to determining a region centered around a first edge pixel includes other edge pixels, determining the first edge pixel as one of the candidate text pixels.

6. The method according to claim 1, wherein the performing projection based segmentation on the candidate text pixels, and determining one or more text regions in the image according to the projection based segmentation result comprises:
   performing horizontal projection based segmentation on the candidate text pixels by using a first cutting threshold to obtain an initial candidate text region;
   performing vertical projection based segmentation on candidate text pixels in the initial candidate text region by using at least one of a second cutting threshold or a third cutting threshold;
   performing, by using at least one of a fourth cutting threshold or a fifth cutting threshold, horizontal projection based segmentation on candidate text pixels in the initial candidate text region obtained after the vertical projection based segmentation, to obtain a target candidate text region; and
   removing non-text region in the target candidate text region using a preset non-text region filtering strategy, and determining a remaining region in the target candidate text region as one of the one or more text regions in the image.

7. The method according to claim 6, wherein the performing horizontal projection based segmentation on the candidate text pixels by using the first cutting threshold to obtain an initial candidate text region comprises:
   traversing the candidate text pixels by rows to detect one or more valid rows, including:
      determining a row in which a quantity of projection points is greater than or equal to the first cutting threshold as a valid row; and
      merging the one or more valid rows to obtain the initial candidate text region.

8. The method according to claim 6, wherein before the performing, by using at least one of the fourth cutting threshold or the fifth cutting threshold, horizontal projection based segmentation on candidate text pixels in the initial candidate text region obtained after the vertical projection based segmentation, to obtain the target candidate text region, the method further comprises:
   performing vertical projection based segmentation on the candidate text pixels in the initial candidate text region by using a geometric position constraint of the candidate text pixels in the initial candidate text region.

9. The method according to claim 6, wherein the vertical projection based segmentation is performed in combination with a geometric position constraint of the candidate text pixels in the initial candidate text region, and wherein the geometric position constraint comprises at least one of:
   a maximum distance between two consecutive candidate text pixels in the initial candidate text region;
   a maximum distance between a highest candidate text pixel and a lowest candidate text pixel in the initial candidate text region;
   a position of the highest candidate text pixel in the initial candidate text region; or
   a position of the lowest candidate text pixel in the initial candidate text region.

10. A text detection apparatus, comprising: a memory configured to store an executable program; and a processor coupled to the memory and configured to:
- collect statistics on distribution of pixel values in a gray level histogram of an image;
- determine an image type of the image according to statistics on the distribution of pixel values;
- obtain edge information of the image;
- determine candidate text pixels in the to-be-detected image according to the edge information of the image by using a preset candidate text pixel determining strategy;
- perform projection based segmentation on the candidate text pixels to obtain a projection based segmentation result; and
- determine one or more text regions in the to-be-detected image according to the projection based segmentation result.

11. The apparatus according to claim 10, wherein the processor is further configured to:
- merge the one or more text regions by rows according to position information of the one or more text regions to obtain a row-merged text region.

12. The apparatus according to claim 11, wherein the processor is further configured to:
- input the row-merged text region to a text detection model trained in advance, and predict a non-text region in the row-merged text region by using the text detection model.

13. The apparatus according to claim 10, wherein the processor is further configured to:
- obtain the edge information of the image by using a first edge detection threshold in response to determining the image type of the image is simple text-graph combination type; and
- obtain the edge information of the to-be-detected image by using a second edge detection threshold in response to determining the image type of the image is complex text-graph combination type wherein the first edge detection threshold is less than the second edge detection threshold.

14. The apparatus according to claim 10, wherein the processor is further configured to:
- determine edge pixels of the image according to the edge information of the to-be-detected image;
- determine target edge pixels in the edge pixels of the image as candidate text pixels; and
- traverse each of the edge pixels, and in response to determining a region centered around a first edge pixel includes other edge pixels, determine the first edge pixel as one of the candidate text pixels.

15. The apparatus according to claim 10, wherein the processor is configured to:
- perform horizontal projection based segmentation on the candidate text pixels by using a first cutting threshold to obtain an initial candidate text region;
- perform vertical projection based segmentation on candidate text pixels in the initial candidate text region by using at least one of a second cutting threshold or third cutting threshold;
- perform, by using at least one of a fourth cutting threshold or a fifth cutting threshold, horizontal projection based segmentation on candidate text pixels in the initial candidate text region obtained after the vertical projection based segmentation, to obtain a target candidate text region; and
- remove the non-text region in the target candidate text region using a preset non-text region filtering strategy, and determine a remaining region in the target candidate text region as one of the one or more text regions in the image.

16. The apparatus according to claim 15, wherein the processor is further configured to:
- traverse the candidate text pixels by rows to detect one or more valid rows, wherein to traverse the candidate text pixels includes:
  - determining a row in which a quantity of projection points is greater than or equal to the first cutting threshold as a valid row; and
  - merging the one or more valid rows to obtain the initial candidate text region.

17. The apparatus according to claim 15, wherein the processor is further configured to:
- perform vertical projection based segmentation on the candidate text pixels in the initial candidate text region by using a geometric position constraint of the candidate text pixels in the initial candidate text region.

18. A non-transitory storage medium, storing an executable program, when being executed by a processor, the program cause the processor to:
- collect statistics on distribution of pixel values in a gray level histogram of an image;
- determine an image type of the image according to statistics on the distribution of pixel values;
- obtain edge information of the image;
- determine candidate text pixels in the image according to the edge information of the image by using a preset candidate text pixel determining strategy;
- perform projection based segmentation on the candidate text pixels to obtain a projection based segmentation result; and
- determine one or more text regions in the image according to the projection based segmentation result.

* * * * *